(12) United States Patent
Tsiatsikas et al.

(10) Patent No.: US 11,627,222 B2
(45) Date of Patent: Apr. 11, 2023

(54) COMPUTER-IMPLEMENTED METHOD OF PROCESSING AN EMERGENCY INCIDENT AND EMERGENCY COMMUNICATION NETWORK

(71) Applicant: Unify Patente GmbH & Co. KG, Munich (DE)

(72) Inventors: Zisis Tsiatsikas, Salonika (GR); Kleoniki Markou, Attiki (GR); Epameinondas Kontothanasis, Athens (GR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 17/569,547

(22) Filed: Jan. 6, 2022

(65) Prior Publication Data
US 2022/0217235 A1 Jul. 7, 2022

(30) Foreign Application Priority Data
Jan. 7, 2021 (EP) .................................... 21150550

(51) Int. Cl.
*H04M 3/51* (2006.01)
*H04M 3/56* (2006.01)

(52) U.S. Cl.
CPC ........... *H04M 3/5116* (2013.01); *H04M 3/56* (2013.01); *H04M 2203/5018* (2013.01)

(58) Field of Classification Search
CPC .............................. H04M 3/5116; H04M 3/56
USPC ......................................... 379/45; 455/404.1
See application file for complete search history.

(56) References Cited

U.S. PATENT DOCUMENTS

| | | | | |
|---|---|---|---|---|
| 9,420,099 | B1 * | 8/2016 | Krishnan | ................ H04W 4/90 |
| 2012/0320912 | A1 | 12/2012 | Estrada et al. | |
| 2013/0078943 | A1 * | 3/2013 | Biage | .................. H04M 3/5116 |
| | | | | 455/404.2 |
| 2018/0027115 | A1 * | 1/2018 | Kamboh | ............. H04L 41/0894 |
| | | | | 379/45 |

OTHER PUBLICATIONS

European Search Report for European Patent Application No. 21150550.8 dated Jun. 9, 2021.

* cited by examiner

*Primary Examiner* — Maria El-Zoobi
(74) *Attorney, Agent, or Firm* — Buchanan Ingersoll & Rooney PC

(57) ABSTRACT

A computer-implemented method of processing an emergency incident can include routing a first emergency call and a second emergency call; verifying that the first emergency call and the second emergency call relate to the same emergency incident; establishing a conference bridge between communication terminals of first and second agents who were assigned the first and second calls so the agents are able to communicate via the conference bridge and to merge the first emergency call and the second emergency call that relate to the same emergency incident. If the first and second emergency calls are merged, a message can be sent to a services provider device (e.g. police station device, fire station device, etc.) for handling the emergency incident. A communication apparatus can be provided to implement embodiments of the method as well.

20 Claims, 2 Drawing Sheets

COMPUTER-IMPLEMENTED METHOD OF PROCESSING AN EMERGENCY INCIDENT AND EMERGENCY COMMUNICATION NETWORK

CROSS-REFERENCE TO RELATED APPLICATIONS

The present application claims priority to European Patent Application No. EP 21 150 550.8, which was filed on Jan. 7, 2021. The entirety of this European Patent Application is incorporated by reference herein.

FIELD

The present invention relates to a computer-implemented method of processing an emergency incident and a corresponding emergency communication network.

BACKGROUND

Emergency calling services are susceptible to a plurality of issues concerning efficiency and the resources they occupy. The reason for this is that the Next Generation 911 (NG911) standard pertains to theoretical solutions which need to cover critical emergency real-life scenarios. However, at present, there is no approach that is able to cover every single possible case.

SUMMARY

We determined that for one and the same emergency incident, a plurality of emergency calls are usually received at an Emergency Services Routing Proxy (ESRP) that routes the calls to corresponding primary Public Safety Answering Points (PSAPs). Each PSAP that receives an emergency call handles this call by a respective agent or call taker, who decides to which secondary PSAP the emergency call needs to be forwarded, as for example, a police station, a fire department, an emergency ambulance, or the like to be eventually handled.

However, as a plurality of emergency calls may be received for the same incident that are routed—for example, due to a Policy Rule Change (PRF) or the like—to different primary PSAPs, the situation might occur that a secondary PSAP that will be in charge of handling the emergency incident receives redundant messages from different primary PSAPs that handle the various emergency calls for that event in the first place. This, however, consumes resources unnecessarily. As mentioned above, however, efficiency is a major issue and thus, there is a need for handling emergency incidents in the most efficient manner.

Embodiments of the present invention can be configured to provide a computer-implemented method of processing an emergency incident and a corresponding emergency communication network for increasing the efficiency of handling an emergency incident and reducing the resources required for handling the emergency incident.

For example, a computer-implemented method of processing an emergency incident in an emergency communication system comprising an ESRP and a plurality of primary PSAPs and a plurality of secondary PSAPs can include: routing, at the ESRP, a first emergency call from a first emergency caller to a first primary PSAP; routing, at the ESRP, a second emergency call from a second emergency caller to a second primary PSAP; verifying, at the ESRP, that the first emergency call and the second emergency call relate to the same emergency incident; and establishing a conference bridge between the first primary PSAP and the second primary PSAP. A first agent at the first primary PSAP and a second agent at the second primary PSAP can be able to communicate via the conference bridge and to merge the first emergency call and the second emergency call that relate to the same emergency incident. If the first and second emergency calls are merged, the ESRP can send a message (e.g. a first message, a single message, etc.) to a secondary PSAP for handling the emergency incident.

By the inventive method, a more efficient handling of emergency calls related to the same emergency incident can be achieved because redundant transmission of calls from primary PSAPs to secondary PSAPs can be reliably avoided. Therefore, resources and time may be saved by embodiments of the inventive method.

According to a preferred embodiment of the method, the ESRP can verify that the first and second emergency calls relate to the same emergency incident by verifying that the first and second emergency calls have been received within a predetermined time frame.

According to another preferred embodiment of the invention, the ESRP can verify that the first and second emergency calls relate to the same emergency incident by determining that the first and second emergency calls are made from a respective location that is within a predetermined distance range (e.g. have the same cell ID, etc.).

According to still another preferred embodiment of the invention, the ESRP can verify that the first and second emergency calls relate to the same emergency incident by verifying that the first and second emergency calls have an incident ID that is related to the same emergency incident.

Preferably, the routing of the first emergency call to the first primary PSAP and the second emergency call to the second primary PSAP that is spatially unrelated to the first primary PSAP is caused by a policy rule change (PRF). The PRF can be a pre-selected or predetermined rule change protocol in some embodiments.

Also, the routing of the first emergency call to the first primary PSAP and the second emergency call to the second primary PSAP that is spatially unrelated to the first primary PSAP can be caused by the first emergency caller using a first Service Provider and the second emergency caller using a second Service Provider different from the first Service Provider.

A communication apparatus or communication system can be provided to implement an embodiment of the method. For example, an emergency communication network can be provided that includes an ESRP connected via a communication network to a plurality of primary PSAPs and a plurality of secondary PSAPs. The ESRP can be configured to carry out an embodiment of the method of processing an emergency incident as outlined above.

The ESRP and the PSAPs can each be a communication device. For example, the ESRP and each of the PSAPs can include a processor connected to a non-transitory computer readable medium (e.g. a non-transitory memory) and at least one transceiver (e.g. a communication network interface for communicative connections). The ESRP and PSAPs can also include at least one input device, at least one input/output device and/or at least one output device. For example, each of these computer devices can include a display connected to the processor, a pointer device connected to the processor, and/or a keyboard connected to the processor. In some configurations of the communication apparatus, the ESRP can be configured as a server that hosts at least one emergency communication service and the PSAPs can be communication terminals (e.g. personal computers, laptop computers, smart phones, etc.). The ESRP can be configured to facilitate communication connections between one or more calling devices used by emergency callers and one or more PSAPs used by emergency care personnel and/or emergency routing service personnel (e.g. one or more dispatchers). The calling devices can include, for example, cell phones, smart phones, laptop computers, tablets, or other types of communication terminals that can facilitate the making of a phone call.

Embodiments of the method and communication apparatus can be configured to provide an efficient mechanism for emergency call correlation and merging that can avoid redundant transmission of emergency calls relating to the same incident to secondary PSAPs. Namely, whenever a call is received at the ESRP from a mobile network, the ESRP can be configured to retrieve the GPS location for the call or, if not available, the cell ID for the call. In case of an IP call, there may be geolocation data, conveyed in the message body. In a different case, the geolocation data can be dereferenced by a location server. The ESRP can store this location information for a certain time period and in case of a policy enforced call rerouting, separate calls handled by different primary PSAPs will be able to merge if they belong to the same actual incident.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Figure 1:
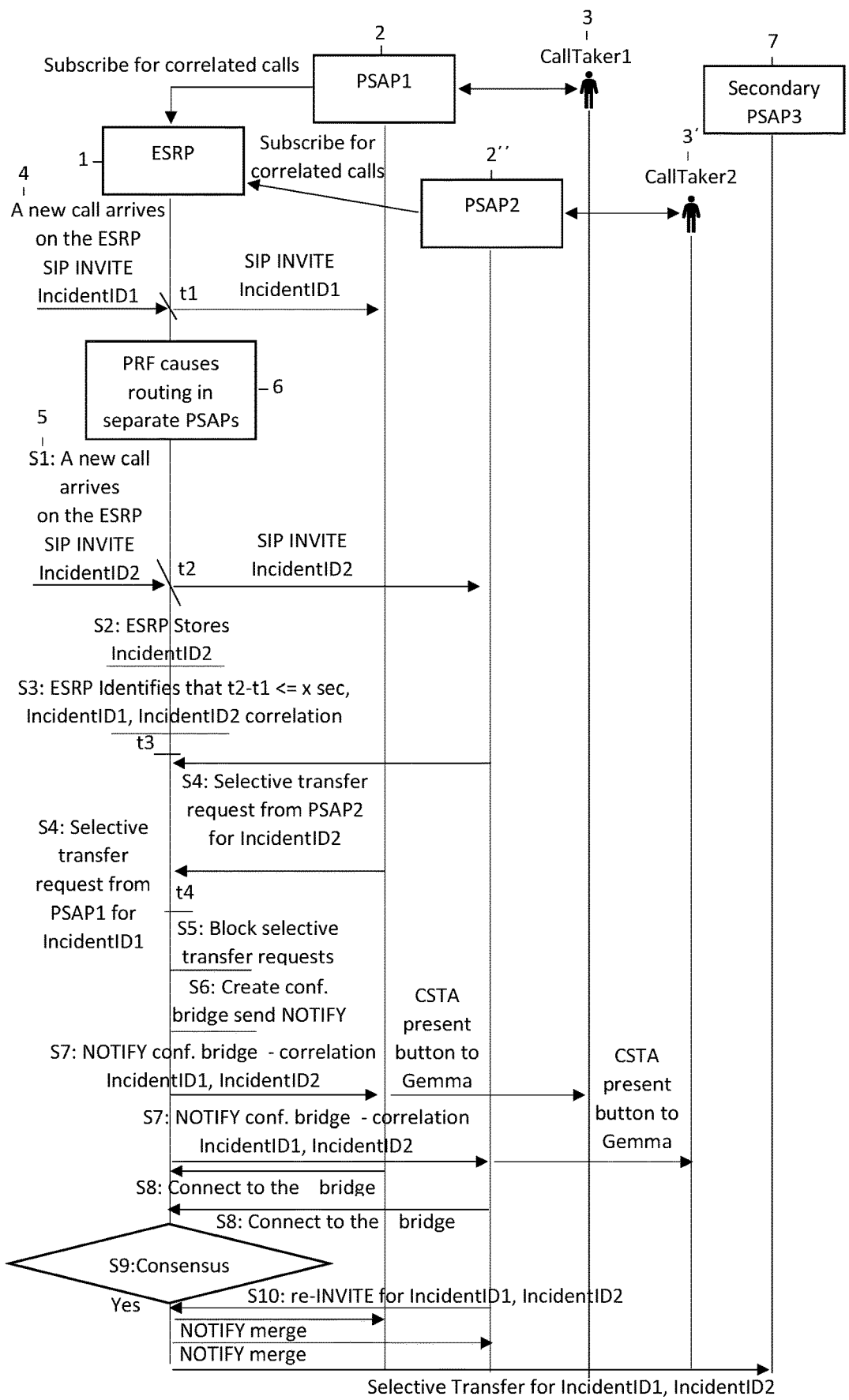
FIG. 1 shows a schematic overview for a NG911 architecture according to an embodiment of the invention, which includes a flow chart illustration of steps S1-S10 for a method of routing emergency calls.

Reference numerals used in the drawings include the following:
1 Emergency Services Routing Proxy (ESRP);
2, 2' primary Public Safety Answering Points (PSAPs);
3, 3' call takers or agents;
4 first emergency call;
5 second emergency call;
6 policy rule change (PRF); and
7 secondary Public Safety Answering Point (PSAP).

DETAILED DESCRIPTION

FIG. 1 shows a schematic overview for a NG911 architecture according to an embodiment of the invention, which can be configured as an Emergency Service Network, ESI-NET. The ESINET can include an Emergency Services Routing Proxy (ESRP) 1 that is connected via a communication network to a plurality of primary Public Saftey Answering Points (PSAPs) 2, 2', at which agents or call takers 3, 3' are located that primarily handle the incoming emergency incidents. Also, there are a plurality of secondary PSAPs, only one of which is illustrated here indicated by reference numeral 7. The agents 3, 3' at the primary PSAPs 2, 2' that initially take care of incoming emergency calls decide to which secondary PSAP 7 the emergency incident has to be reported to be handled, for example, the secondary PSAP 7 may be a communication terminal for a fire brigade, a police station, or the like.

It should be appreciated that the ESRP and the PSAPs can each be a communication device. For example, the ESRP and each of the PSAPs can include a processor connected to a non-transitory computer readable medium (e.g. a non-transitory memory) and at least one transceiver (e.g. a communication network interface for communicative connections). The ESRP and PSAPs can also include at least one input device, at least one input/output device and/or at least one output device. For example, each of these computer devices can include a display connected to the processor, a pointer device connected to the processor, and/or a keyboard connected to the processor. In some configurations, the ESRP can be configured as a server that hosts at least one emergency communication service and the PSAPs can be communication terminals (e.g. personal computers, laptop computers, smart phones, etc.).

The ESRP can be configured to facilitate communication connections between one or more calling devices used by emergency callers and one or more PSAPs used by emergency care personnel and/or emergency routing service personnel (e.g. one or more dispatchers). The emergency calling devices that may be used to make an emergency call by an emergency caller can include, for example, cell phones, smart phones, laptop computers, tablets, or other types of communication terminals that can facilitate the making of a phone call.

It is assumed that here, there are two active calls in the ESINET that relate to the same emergency incident or event, wherein the two calls carry different incident identifiers, incidentID1 and incidendID2, as will be explained in further detail below.

Namely, in the example illustrated in FIG. 1, as the two calls arrive at the ESRP 1, the first call indicated by reference numeral 4 carries a first incident ID value, here "IncidentID1" that has been assigned by a previous entity in the ESINET, or alternatively, the ESRP 1 may assign a random incident ID for each SIP INVITE request. The second call indicated by reference numeral 5 carries a second incident ID value, here "IncidentID2" that also may have been assigned by a previous entity of the ESINET or may have been assigned as a random incident ID by the ESRP 1.

Thus, there are two emergency calls that are received at the ESRP 1, and that have been made by two different emergency callers with respect to the same emergency event, wherein the emergency callers are also located in the same geographical region. It is assumed that these two emergency calls are independent in terms of awareness between the emergency callers. Thus, the two SIP INVITE requests will enter the Emergency Service Network, ESI-NET, and a new header will be inserted into the SIP requests which conveys the incident ID for the emergency incident. It is noted that according to prior art, yet there is no feasible and inexpensive way to identify whether these calls are correlated. However, it is clear that the delay of the emergency call has to be avoided, because every minute can be critical for the emergency caller.

Due to a policy rule change (PRF), indicated by reference numeral 6 in FIG. 1, the two emergency calls may be routed to spatially unrelated primary PSAP elements, PSAP1 indicated by reference numeral 2 and PSAP2 indicated by reference numeral 2'. It is noted that the different primary PSAP elements PSAP1 2 and PSAP2 2' may also belong to different vendors and/or service providers.

For example, PSAP1 indicated by reference numeral 2 may be a CISCO product, located in Riverside, Calif., while PSAP2 indicated by reference numeral 2' may be a Motorola product, located in San Diego, Calif. If the ESRP 1 shown in FIG. 1, that may be for example, a UNIFY product, decides to route two context-related (i.e., incident-related) calls to two unrelated PSAP elements, then the only entity that is in a position to correlate these calls and make the two agents or call takers aware of this situation is the ESRP 1.

This is because under normal conditions, the PSAP call takers 3, 3' are able to correlate 2 calls only if they store the incident ID in the system, and/or accurate location information. In any of the cases outlined above, the uniqueness of these pieces of data would be the only correlation mechanism between the two PSAP agents 3, 3' who may need to communicate efficiently during a heavy call load, for example, due to a major emergency incident that has occurred.

According to emergency handling known from prior art, the two spatially unrelated PSAP call takers 3, 3' will receive the two context-related but incidentID-unrelated calls, and they will need to interview the emergency caller in order to be able to transfer the emergency call to a secondary PSAP 7, for example, an emergency services provider (e.g. ambulance provider or emergency care provider) or the police or the fire department or the like.

If the two call takers 3, 3' initiate a selective transfer request to the secondary PSAP 7 for the same service, as indicated by step S4 in FIG. 1, then the two selective transfer attempts will be correlated by the ESRP 1 and the call takers 3, 3' will be informed about the correlation.

Figure 2:
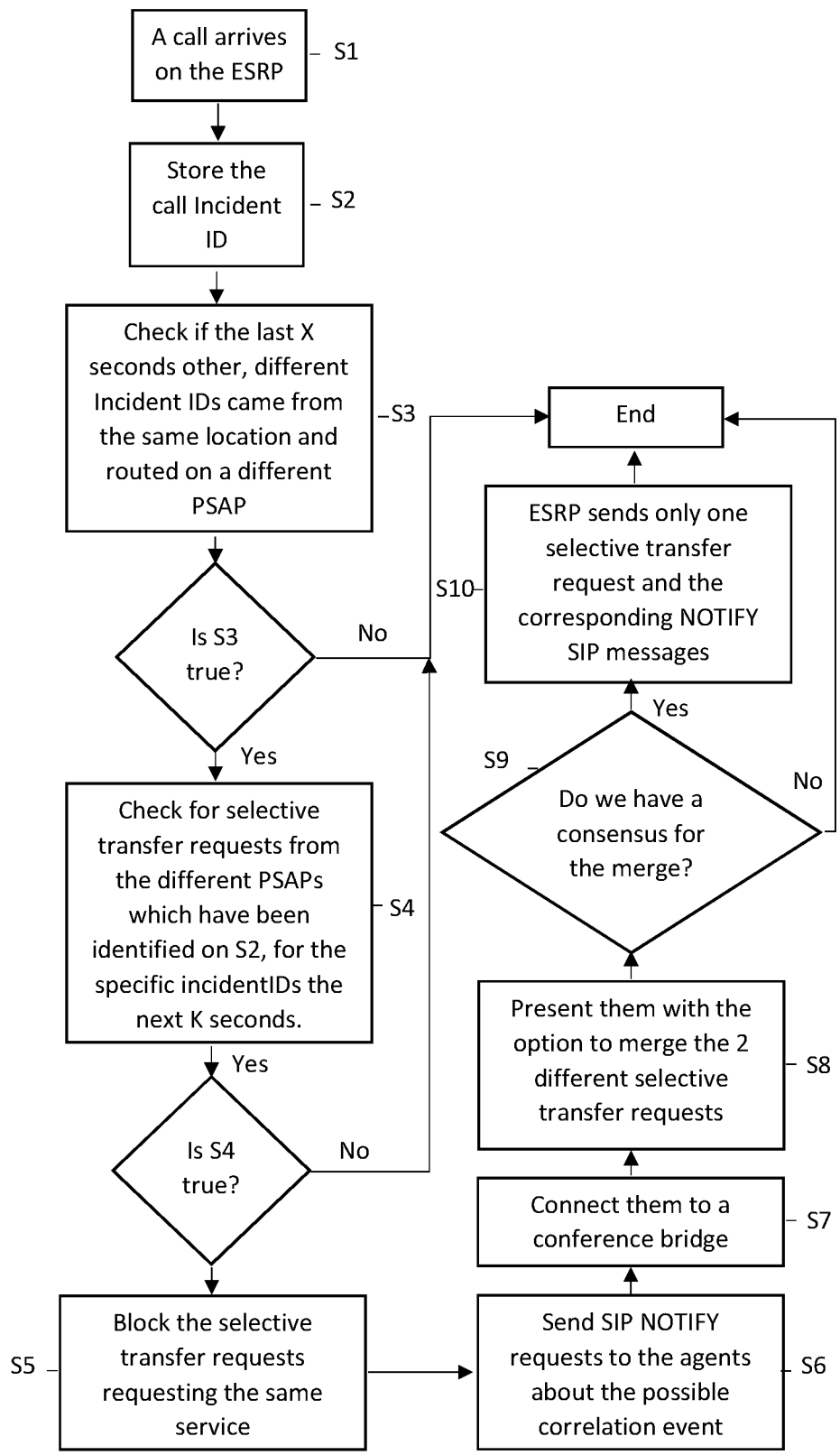
FIG. 2 shows a flow chart for the method of processing an emergency incident according to an embodiment of the invention, which includes an illustration of steps S1-S10 of this exemplary embodiment of this method.

FIG. 2 shows a flow chart for the method of processing an emergency incident according to an embodiment of the invention. Here, in a first step S1, a new emergency call arrives at the ESRP (see FIG. 1, ESRP 1). In a second step S2, the ESRP 1 stores the Incident ID of the new call that at that point is just a random number generated by the entry point of ESINET network. In the subsequent step S3, the ESRP 1 tries to verify whether there is any correlation between the current call and any other call that has been already routed to the primary PSAP. In order to do so, it checks whether during the last X seconds, i.e., within a predetermined time period, other calls with different incident IDs have been received from the same location (for example, based on GPS data, cell ID, or geolocation data for VoIP calls) and/or the type of the originating endpoint (mobile/fixed telephony device).

In case the ESRP 1 identifies a correlation between some calls, then it checks whether the correlated calls have been routed to different primary PSAPs 2, 2' and marks them as "Possible merge calls on different PSAPs". In another step S4, for the calls that appear in the "Possible merge calls on different PSAPs" list, the ESRP 1 will check for selective transfer requests from the primary PSAPs 2, 2' within a specific timeframe, for example, K seconds. This specific timeframe may be automatically defined by historic data on the basis of the time it takes for a PSAP agent 3, 3' to start the Selective Transfer request.

As it is shown in FIG. 1, the ESRP 1 sends the new call to a first call taker, indicated by reference number 3, at a first point of time t1, and later on, at a second point of time t2 propagates a second new call indicated by reference numeral 5 in FIG. 1 to a second agent or call taker 3' at another primary PSAP2 indicated by reference numeral 2' in FIG. 1.

At some point, for example, when routing the emergency calls to a secondary PSAP 7, (which is secondary PSAP3 in FIG. 1), it identifies that the calls are correlated and at that point of time, it starts the 'Waiting for Selective Transfer Request Timer". The duration of the timer may be the maximum value between the average time agent X or call taker 3 at the primary first PSAP1 needs in order to send the selective transfer request and the average time that agent Y or call taker 3' at other primary PSAP2 needs in order to send the selective transfer request.

Upon receipt of the expected selective transfer requests, the timer will be cleared and the next step S6 will be executed. If the ESRP 1 does not receive all of the selective transfer requests during the timeframe of a t4 to t3 time slot, i.e., the K period mentioned earlier, then the ESRP 1 will un-block any blocked selective transfer request. The ESRP 1 will also notify the primary PSAPs 2, 2' that there is no option for selective transfer requests merging. In step S5, upon receipt of the selective transfer requests towards the same service by the primary PSAPs 2, 2' for the above-mentioned calls, the ESRP 1 will temporarily block the requests for the calls that are members of the "Possible merge calls" list. It could be possible for the agent or call taker to overcome the functionality of the proposed feature for a specific call by notifying the ESRP 1 not to block the selective transfer request. In order to do so, the agent or call taker will use a NOTIFY message to ESRP 1.

In step S6, the ESRP 1 will send a NOTIFY request to the PSAP agents or call takers 3, 3' informing them about the possible correlation event. Then, in step S7, based on this NOTIFY mechanism, it will be possible for the PSAP agents or call takers 3, 3' to get connected on a conference bridge automatically by selecting a corresponding button so as to communicate with each other and to figure out that the emergency calls may be merged. In step S8, while the PSAP agents are communicating via the conference bridge, they will be provided with an option to merge the two different selective transfer requests. In step S9, in case the PSAP agents or call takers 3, 3' come to a consensus about the merging of the selective transfers, it is proceeded with the next step S10 in which the ESRP 1 will merge them into one using a re-INVITE from the corresponding agent. Finally, SIP NOTIFY messages will be sent to the PSAP agents or call takers 3, 3', in order to verify that the selective transfer call merging has been completed successfully.

It should be appreciated that different embodiments of the method, communication system, and a communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A computer-implemented method of processing an emergency incident in an emergency communication system the method comprising:
routing, at an Emergency Services Routing Proxy (ESRP), a first emergency call from a first emergency caller device to a first primary Public Safety Answering Point (PSAP);
routing at the ESRP, a second emergency call from a second emergency caller device to a second primary PSAP;
in response to determining that a first selective transfer request for the first emergency call sent by the first primary PSAP and a second selective transfer request for the second emergency call sent by the second primary PSAP were sent within a pre-selected time period, blocking, by the ESRP, the first selective transfer request and the second selective transfer request;
verifying, at the ESRP that the first emergency call and the second emergency call relate to a same emergency incident;
establishing a conference bridge between the first primary PSAP and the second primary PSAP, wherein a first agent at the first primary PSAP and a second agent at the second primary PSAP are communicatably connected via the conference bridge and the first emergency call and the second emergency call that relate to the same emergency incident are mergeable via the conference bridge; and
in response to merging of the first and second emergency calls, sending, by the ESRP, a message to a secondary PSAP for handling the emergency incident.

2. The method of claim 1, wherein the message sent to the secondary PSAP is a single message.

3. The method of claim 1, wherein the verifying, at the ESRP that the first emergency call and the second emergency call relate to the same emergency incident comprising:
the ESRP verifying that the first and second emergency calls relate to the same emergency incident by verifying that the first and second emergency calls have been received within a predetermined time frame.

4. The method of claim 1, wherein the verifying, at the ESRP that the first emergency call and the second emergency call relate to the same emergency incident comprising:
the ESRP verifying that the first and second emergency calls relate to the same emergency incident by determining that the first and second emergency calls are made from a respective location that is within a predetermined distance range of each other.

5. The method of claim 4, wherein the predetermined distance range is determined to exist when the first and second emergency calls have a same cell ID.

6. The method of claim 1, wherein the verifying, at the ESRP that the first emergency call and the second emergency call relate to the same emergency incident comprising:
the ESRP verifying that the first and second emergency calls relate to the same emergency incident by verifying that the first and second emergency calls have an incident ID that is related to the same emergency incident.

7. The method of claim 1, wherein:
the routing of the first emergency call to the first primary PSAP and the second emergency call to the second primary PSAP that is spatially unrelated to the first primary PSAP is caused by a policy rule change (PRF).

8. The method of claim 1, wherein:
the routing of the first emergency call to the first primary PSAP and the second emergency call to the second primary PSAP that is spatially unrelated to the first primary PSAP is caused by the first emergency caller device using a first Service Provider and the second emergency caller device using a second Service Provider different from the first Service Provider.

9. A communication apparatus comprising:
an Emergency Services Routing Proxy (ESRP) connectable to a plurality of primary Public Safety Answering Points (PSAPs) and a plurality of secondary PSAPs via at least one communication network, the ESRP also being communicatively connecatable to multiple emergency caller devices, the ESRP comprising a processor connected to a non-transitory computer readable medium, wherein the ESRP is configured to:
route a first emergency call from a first emergency caller device to a first primary PSAP of the plurality of primary PSAPs;
route a second emergency call from a second emergency caller device to a second primary PSAP of the plurality of primary PSAPs;
respond to a determination that a first selective transfer request for the first emergency call sent by the first primary PSAP and a second selective transfer request for the second emergency call sent by the second primary PSAP were sent within a pre-selected time period by blocking the first selective transfer request and the second selective transfer request;
verify that the first emergency call and the second emergency call relate to a same emergency incident;
establish a conference bridge between the first primary PSAP and the second primary PSAP so that a first agent at the first primary PSAP and a second agent at the second primary PSAP are communicatably connected via the conference bridge and the first emergency call and the second emergency call are mergeable via the conference bridge; and
send a message to a secondary PSAP of the plurality of secondary PSAPs for handling the emergency incident in response to merging of the first and second emergency calls.

10. The communication apparatus of claim 9, wherein the message is a single message.

11. The communication apparatus of claim 9, wherein the ESRP verifies that the first and second emergency calls relate to the same emergency incident by verifying that the first and second emergency calls have been received within a predetermined time frame.

12. The communication apparatus of claim 9, wherein the ESRP verifies that the first and second emergency calls relate to the same emergency incident by determining that the first and second emergency calls are made from a respective location that is within a predetermined distance range of each other.

13. The communication apparatus of claim 12, wherein the predetermined distance range is determined to exist when the first and second emergency calls have a same cell ID.

14. The communication apparatus of claim 9, wherein the ESRP verifies that the first and second emergency calls relate to the same emergency incident by verifying that the first and second emergency calls have an incident ID that is related to the same emergency incident.

15. The communication apparatus of claim 9, wherein the ESRP is configured so that routing of the first emergency call to the first primary PSAP and the second emergency call to the second primary PSAP that is spatially unrelated to the first primary PSAP is caused by a policy rule change (PRF).

16. The communication apparatus of claim 9, wherein the ESRP is configured so that routing of the first emergency call to the first primary PSAP and the second emergency call to the second primary PSAP that is spatially unrelated to the first primary PSAP is caused by the first emergency caller device using a first Service Provider and the second emergency caller device using a second Service Provider different from the first Service Provider.

17. The communication apparatus of claim 9, wherein the ESRP is configured to communicate with the first primary PSAP and the second primary PSAP to present an option of merging the first selective transfer request and the second selective transfer request so only a single selective transfer request is sent by the ESRP.

18. The communication apparatus of claim 17, the ESRP is configured to assign a first incident ID to the first emergency call and assign a second incident ID to the second emergency call.

19. The method of claim 1, comprising:

the ESRP communicating with the first primary PSAP and the second primary PSAP to present an option of merging the first selective transfer request and the second selective transfer request so only a single selective transfer request is sent by the ESRP.

20. The method of claim 19, comprising:

the ESRP assigning a first incident ID to the first emergency call; and the ESRP assigning a second incident ID to the second emergency call.

* * * * *